Dec. 1, 1942. C. L. OSELAND 2,303,704
TEMPERATURE-RESPONSIVE DEVICE
Filed Oct. 10, 1939 2 Sheets-Sheet 2
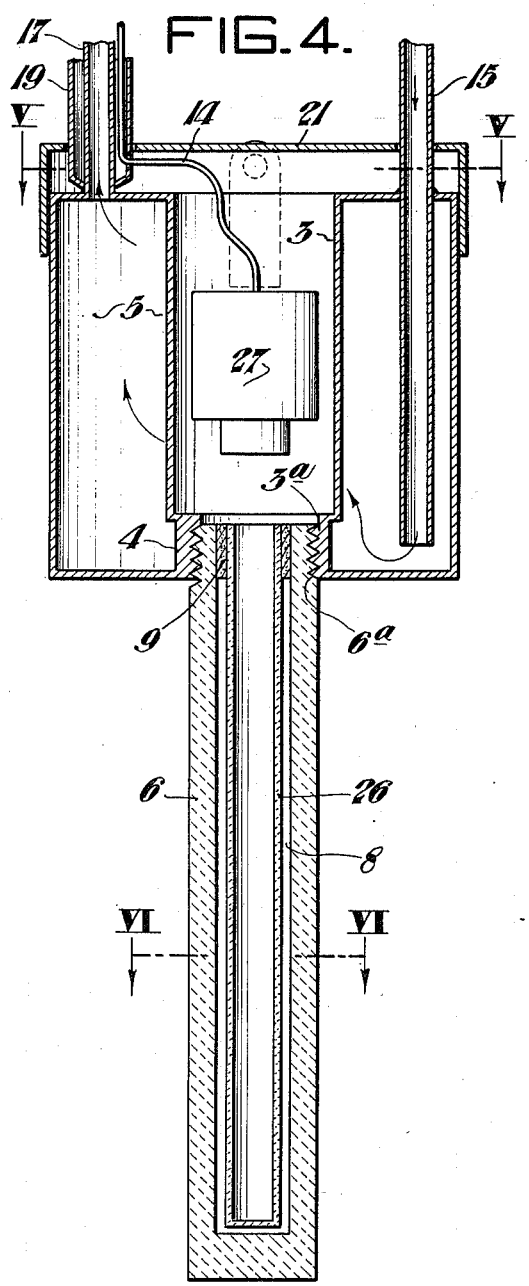
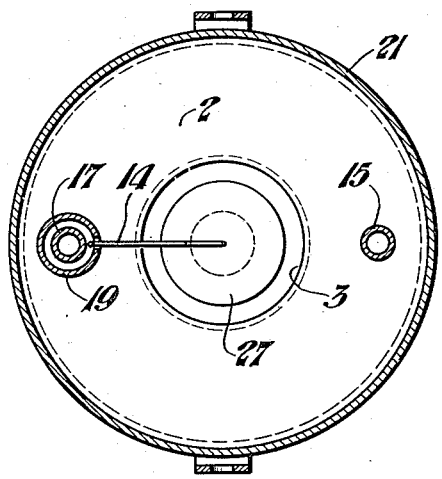
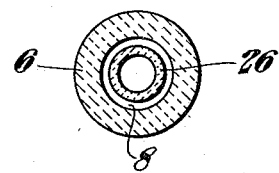
Inventor:
Carl L. Oseland,
by: John E. Jackson
his Attorney.

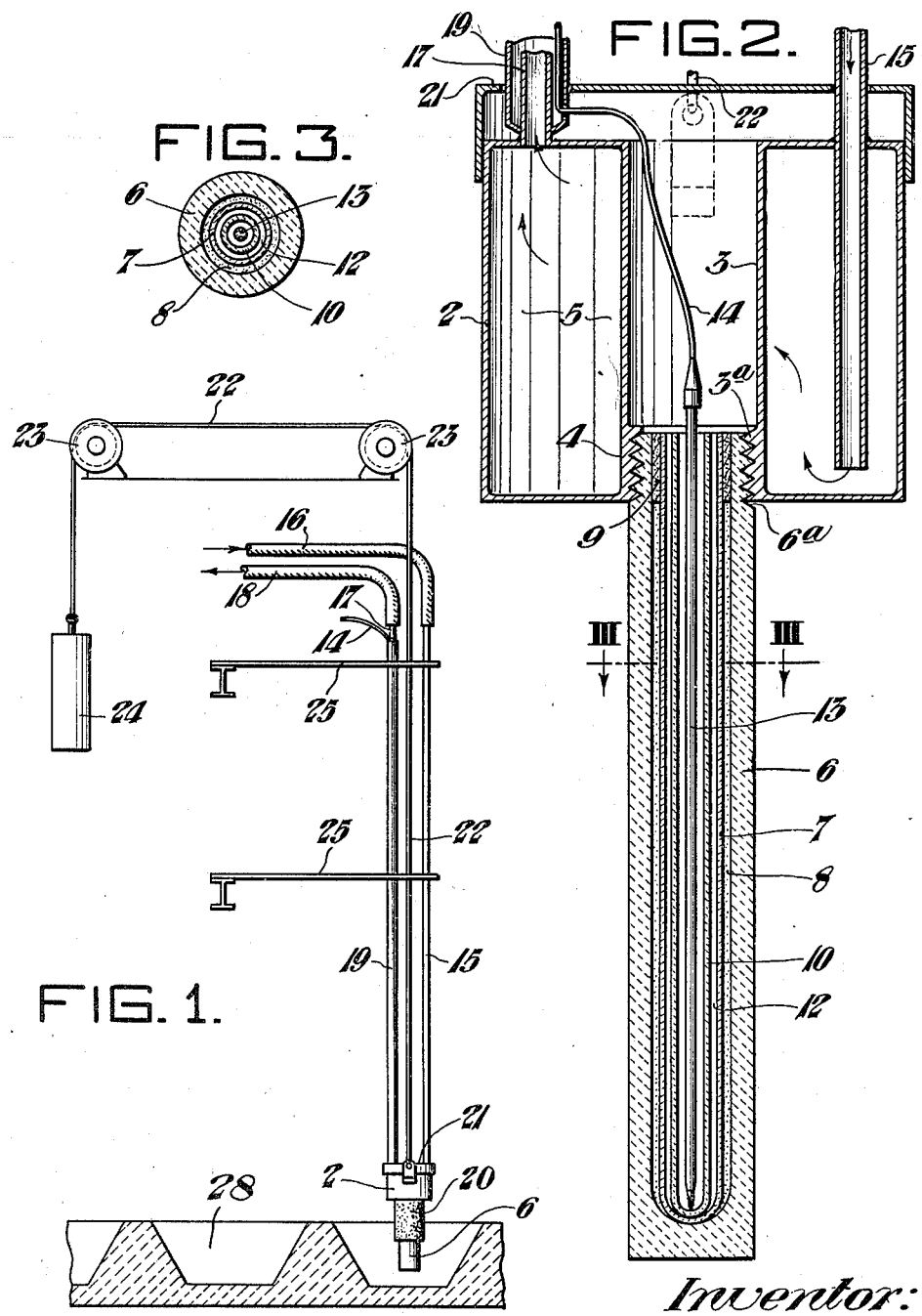

Patented Dec. 1, 1942

2,303,704

UNITED STATES PATENT OFFICE 2,303,704

TEMPERATURE RESPONSIVE DEVICE

Carl L. Oseland, Gary, Ind.

Application October 10, 1939, Serial No. 298,855

7 Claims. (Cl. 136—4)

This invention relates to a means for determining the temperature of molten metal and, particularly, to an improved device for continuously determining the temperature of iron as it is being discharged from a blast furnace.

It is the general practice in the steel industry, as is well known to those skilled in the art, to measure the temperature of the molten iron in the blast furnace intermittently by means of a manually controlled optical pyrometer. While this means of determining the temperature of the iron in the furnace has been universally adopted as the most reliable means for determining the temperatures thereof, inaccurate measurements oftentimes result from the use of such means due primarily to the changes in emissivity, the smoke, and the human element. Furthermore, such intermittent measurements do not always indicate the true average temperature of the metal. It is well known that the more accurate the temperature of the iron can be determined, the better the necessary corrective measures can be controlled to improve the blast furnace operations to maintain a uniformly high quality of iron.

In the present invention, there is provided a means for determining the temperature of the iron continuously and accurately throughout the casting period, thereby eliminating the above named disadvantages and aiding in producing a better product.

Accordingly, it is one of the objects of the present invention to provide an improved means by which the temperature of the molten iron can be continuously and automatically determined throughout the casting period.

It is another object of the invention to provide an improved means for continuously determining the temperature of molten iron during the casting period which is simple and easy in its operation and use, and, at the same time, a means by which the temperature thereof can be effectively and efficiently determined.

It is another object of the invention to provide an improved means for continuously determining the temperature of molten iron during the casting operation which is simple and inexpensive in its construction, and easily and quickly maintained.

Various other objects and advantages of this invention will become more apparent in the course of the following specification and will be particularly pointed out in the appended claims.

In the accompanying drawings there is shown, for the purpose of illustration and description, one embodiment and a modification thereof, which my invention may assume in practice.

In these drawings:

Figure 1 is an elevation of the improved means or apparatus of my invention for determining the temperature of molten metal;

Figure 2 is a vertical section through the preferred form of the device used in connection with the present invention for determining the temperature of molten metal;

Figure 3 is a sectional view taken on line III—III of Figure 2;

Figure 4 is a vertical section similar to Figure 2 through a modified form of the device and in connection with the present invention for determining the temperature of the metal;

Figure 5 is a sectional view taken on line V—V of Figure 4, and

Figure 6 is a sectional view taken on line VI—VI of Figure 4.

Referring more particularly to the drawings, the improved means or device of my invention, as shown in Figures 2 and 3, comprises a hollow body member 2, preferably cylindrical-shaped, having a tubular portion 3 arranged centrally therein and extending therethrough and a thickened lower portion 4 and a cooling chamber 5 arranged therearound.

There is connected to the body member 2 at the lower end of the tubular portion 3 therethrough, and extending downwardly therefrom, a longitudinally extending outer protective tube 6 having the lower end thereof permanently closed and the upper end open and which is preferably made from graphite or any other suitable material which will withstand the high temperature of the molten iron. The tube 6 preferably has a threaded portion 6ª on the upper end thereof which cooperates with the threaded portion 3ª of the thickened portion 4 of the body member at the bottom of the tubular portion 3 to connect the same thereto.

There is disposed within the graphite tube 6, a longitudinally extending tube 7 preferably having the lower end thereof closed and the upper end open and which is preferably made of a suitable refractory material impervious to gases such as corundum. The tube 7 preferably has an outer diameter substantially smaller than the inner diameter of the graphite tube 6 so as to provide a space 8 therebetween in which there is disposed a finely ground refractory material, but preferably this space is packed, adjacent the top of the tubes, with asbestos or any other suitable material 9 which will prevent oxidation of the inner wall of the graphite tube 6.

There is positioned within the refractory tube 7, a similar longitudinally extending tube 10 also having the lower end thereof closed and the upper end open and which is also made preferably of corundum, or any other metallic refractory material. The tube 10 preferably has an outer diameter substantially smaller than the inner diameter of the tube 7 so as to provide a space 12 therebetween to permit the injurious gases to be diluted with air and escape to the atmosphere.

There is mounted within the inner tube 10, a suitable temperature-responsive means, preferably a thermocouple 13 having its hot junction at the lower end thereof. The upper end of the thermocouple 13 is connected to a suitable temperature recording instrument (not shown), preferably by means of lead wires 14 extending upwardly through the tubular portion 3 in the body member 2.

There is connected to the top of the body member 2 and communicating with the cooling chamber 5 therein and extending upwardly therefrom, a relatively long cooling fluid inlet supply pipe 15 having the upper end thereof preferably connected to a flexible hose 16, as shown in Figure 1 of the drawings, which, in turn, is connected to a suitable source of cooling fluid supply (not shown). There is also connected to the body member 2 and communicating with the cooling chamber 5 and extending upwardly therefrom, preferably diametrically opposite from the inlet pipe 15, a similar relatively long cooling fluid outlet pipe 17 having the upper end thereof similarly connected to a flexible outlet hose 18. There is preferably concentrically disposed around the outlet pipe 17, but it may be disposed around the inlet pipe 15, if desired, a protective pipe 19 of substantially larger diameter, which is adapted to protect the lead wires 14 from the high casting temperature of the iron. That is, the lead wire extends from the thermocouple 13 to which it is connected up through the tubular portion 3 in the body member 2 up between the pipes 17 and 19 and out to the temperature recording instrument to which it is connected.

It will be understood that it is the purpose of the cooling chamber 5 to prevent the lead wires 14 from burning and to maintain a constant temperature at the connection of the lead wire with the thermocouple so as to prevent any error in the temperature measurement. The cooling medium used is preferably water, but compressed air may be used if desired. The outer surface of that portion of the graphite tube which extends above the surface of the molten iron is preferably coated with a refractory material such as clay as at 9 so as to prevent oxidation of this portion of the graphite tube during use, as shown in Figure.

The top of the body member 2 and tubular portion 3 therethrough is preferably enclosed by loose-fitting cover 21 so as to prevent foreign materials from falling into the opening and the tube assembly. In use, the device is preferably suspended on the end of a cable 22, as shown in Figure 1, which is disposed over pulleys 23 and counterbalanced by means of the weight 24 on the opposite end of the cable, but it will be understood that any other suitable means may be provided for supporting the same and for the purpose of raising and lowering the device into and out of the molten metal and there is preferably provided suitable guiding means, such as slide bars 25 for guiding the device by means of the pipes 15 and 19 in its vertical movement into and out of the metal.

In Figures 4, 5 and 6 of the drawings, there is shown a slight modification of the temperature responsive device of the present invention. In this form of the device, there is but a single tube 26 arranged within the graphite tube 6 which, as in the preferred embodiment, is preferably made of corundum or any other suitable refractory material, and there is arranged in the tubular portion 3 of the body member 2 a radiation-responsive unit 27 which is also connected to a suitable temperature recording instrument (not shown) by means of the lead wire 14 for recording the temperature of the molten iron.

As shown in Figure 1 of the drawings, the improved temperature measuring device of my invention is shown, merely for the purpose of illustration, for determining the temperature of the molten iron as it is being discharged from a blast furnace. The device is positioned over an iron runner 28 and lowered so that the graphite tube thereof is immersed in the molten iron preferably at a point directly above the slag skimmer dam and the temperature thereof is automatically recorded by the temperature recording instrument continuously throughout the casting operation. It will be understood that the device cannot only be used in connection with blast furnaces for determining the temperature of the molten iron as it is being discharged therefrom, but can be used with all types of furnaces, such as cupola furnaces, and also open hearth mixers, ladles and the like for determining the temperature of the molten metal therein.

While I have shown and described one embodiment and a modification of my invention, it will be understood that these embodiments are merely for the purpose of illustration and description and that various other forms may be devised within the scope of my invention, as defined by the appended claims.

I claim:

1. A device of the class described comprising a body member having a tubular portion arranged centrally therein and extending therethrough, a cooling chamber arranged in said body member around said tubular portion, means for conveying a cooling fluid into and through said cooling chamber, a longitudinally extending graphite tube extending downwardly from said body member, said graphite tube having the lower end thereof permanently closed and the upper end open which is attached to the lower end of said tubular portion disposed through the body member thereby closing the same, a tube made of refractory material disposed within said graphite tube, said refractory tube having a smaller outside diameter than the inner diameter of said graphite tube so as to provide a space therebetween, means for sealing the space between the refractory tube and the graphite tube at the top thereof so as to prevent oxidation of the inside of the graphite tube, a second tube made of a similar refractory material disposed within said first mentioned refractory tube, said second tube having a smaller outside diameter than the inner diameter of said first mentioned refractory tube so as to provide a space therebetween for permitting the gases to escape, a thermocouple disposed inside of said last mentioned refractory tube, wires extending through the tubular portion in said body member for connecting said thermocouple to a temperature recording instrument, and means carried by said body member and extending thereabove for housing said connecting wires which consists of a pipe communicating with the cooling chamber through which the cooling fluid is adapted to flow thereinto and a larger pipe telescopically arranged around the first mentioned pipe so as to provide a space therebetween with the wires disposed in the space between the pipes so as to protect the same.

2. A device of the class described as defined in claim 1 wherein the refractory tubes are formed of corundum.

3. In a device of the class described, a body member having a tubular portion arranged centrally therein and extending therethrough, said body member having a cooling chamber arranged therein around said tubular portion, means for conveying a cooling fluid into and through said cooling chamber, a temperature responsive device, means connected to said body member at the lower end of said tubular portion and extending downwardly therefrom for housing said temperature responsive device, means extending through said tubular portion for connecting said temperature responsive device to a temperature recording instrument, and a pipe communicating with the cooling chamber through which the cooling fluid is adapted to flow, with a larger pipe telescopically arranged around the first mentioned pipe so as to provide a space therebetween with said last mentioned means disposed between said pipes in said space so that said means is protected by said pipes.

4. In a device of the class described, the combination as defined in claim 3 wherein the means for housing the temperature responsive device includes a graphite tube extending downwardly from the body member, having the lower end thereof permanently closed with the upper end open which is attached to the lower end of the tubular portion arranged through the body member thereby closing the same.

5. In a device of the class described, the combination as defined in claim 3 wherein the means for housing the temperature responsive device includes a graphite tube extending downwardly from the body member, having the lower end thereof permanently closed with the upper end open which is attached to the lower end of the tubular portion arranged through the body member thereby closing the same, and a plurality of tubes made of a refractory material telescopically arranged one within the other within said graphite tube with the temperature responsive device disposed within the innermost of said refractory tubes.

6. In a device of the class described, the combination as defined in claim 3 wherein the means for housing the temperature responsive device includes a graphite tube extending downwardly from the body member, having the lower end thereof permanently closed with the upper end open which is attached to the lower end of the tubular portion arranged through the body member thereby closing the same, at least one tube made of a refractory material disposed within said graphite tube, said refractory tube having a smaller outside diameter than the inner diameter of said graphite tube so as to provide a space therebetween, and means for sealing the space between the refractory tube and the graphite tube at the top thereof so as to prevent oxidation of the inside of the graphite tube, said temperature responsive device being disposed within said refractory tube.

7. In a device of the class described, the combination as defined in claim 3 wherein the means for housing the temperature responsive device includes a graphite tube extending downwardly from the body member, having the lower end thereof permanently closed with the upper end open which is attached to the lower end of the tubular portion arranged through the body member thereby closing the same, a tube made of refractory material disposed within said graphite tube, said refractory tube having a smaller outside diameter than the inner diameter of said graphite tube so as to provide a space therebetween, means for sealing the space between the refractory tube and the graphite tube at the top thereof so as to prevent oxidation of the inside of the graphite tube, and a second tube made of a similar refractory material disposed within said first mentioned refractory tube, said second refractory tube having a smaller outside diameter than the inner diameter of said first mentioned refractory tube so as to provide a space therebetween for diluting the gases and permitting them to escape with the temperature responsive device being disposed within said second refractory tube.

CARL L. OSELAND.